(12) United States Patent
Baek et al.

(10) Patent No.: US 8,451,392 B2
(45) Date of Patent: May 28, 2013

(54) LIQUID CRYSTAL DISPLAY AND METHOD OF MANUFACTURING LIQUID CRYSTAL DISPLAY HAVING PARTICULAR LIQUID CRYSTAL FILM

(75) Inventors: Jong-In Baek, Yongin (KR); Won-Sang Park, Yongin (KR); Jae-Hyun Kim, Yongin (KR); Jae-Ik Lim, Yongin (KR)

(73) Assignee: Samsung Display Co., Ltd. (KR)

( * ) Notice: Subject to any disclaimer, the term of this patent is extended or adjusted under 35 U.S.C. 154(b) by 259 days.

(21) Appl. No.: 13/084,422

(22) Filed: Apr. 11, 2011

(65) Prior Publication Data
US 2012/0062807 A1 Mar. 15, 2012

(30) Foreign Application Priority Data

Sep. 14, 2010 (KR) ........................ 10-2010-0090065

(51) Int. Cl.
*G02F 1/133* (2006.01)
*G02F 1/1337* (2006.01)
*G02F 1/1343* (2006.01)
*G02F 1/1341* (2006.01)

(52) U.S. Cl.
USPC .............. 349/33; 349/129; 349/141; 349/189

(58) Field of Classification Search
USPC ..................... 349/33, 129, 141, 189
See application file for complete search history.

(56) References Cited

U.S. PATENT DOCUMENTS

| 7,727,847 B2* | 6/2010 | Tanaka et al. ................. 438/314 |
| 8,173,519 B2* | 5/2012 | Morisue et al. ................ 438/458 |
| 8,237,349 B2* | 8/2012 | Nishida et al. ................ 313/501 |

FOREIGN PATENT DOCUMENTS

| JP | 04-338923 A | 11/1992 |
| JP | 2001-066576 A | 3/2001 |
| JP | 2008-191420 A | 8/2008 |
| KR | 1020050103687 A | 11/2005 |

* cited by examiner

*Primary Examiner* — Mike Qi
(74) *Attorney, Agent, or Firm* — Knobbe Martens Olson & Bear LLP

(57) ABSTRACT

A liquid crystal display (LCD) includes: a first substrate; a second substrate facing the first substrate; an electrode portion formed on at least one of the first substrate and the second substrate, and configured to generate an electric field between the first substrate and the second substrate; and a liquid crystal film positioned between the first substrate and the second substrate, and at least one liquid crystal and an associated liquid crystal space in the liquid crystal film.

17 Claims, 11 Drawing Sheets

(a) 320 (b)

FIG. 11
300
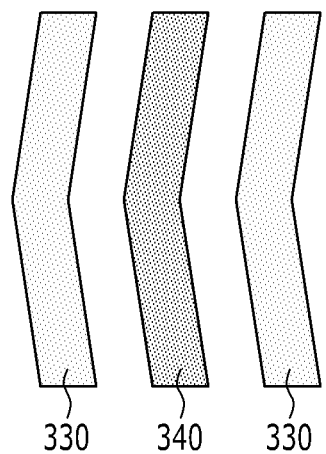 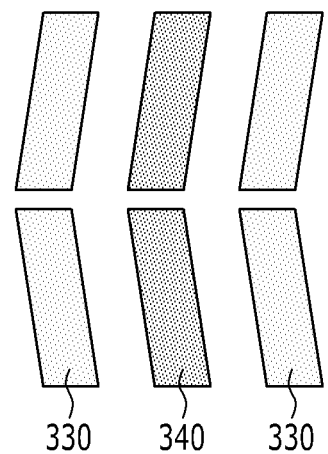
330 340 330     330 340 330
(a)           (b)

LIQUID CRYSTAL DISPLAY AND METHOD OF MANUFACTURING LIQUID CRYSTAL DISPLAY HAVING PARTICULAR LIQUID CRYSTAL FILM

CROSS-REFERENCE TO RELATED APPLICATIONS

This application claims priority to and the benefit of Korean Patent Application No. 10-2010-0090065 filed in the Korean Intellectual Property Office on Sep. 14, 2010, the entire contents of which are incorporated herein by reference.

BACKGROUND

1. Field

The described technology relates generally to a liquid crystal display (LCD). More particularly, the described technology relates to a liquid crystal display (LCD) including a liquid crystal film, and a manufacturing method thereof.

2. Description of the Related Technology

A display device displays images, and interest in the display device has recently increased such that various technologies for performance improvement of the display device have been proposed.

Among various kinds of display devices, liquid crystal displays (LCDs) have largely succeeded in the market, and there is substantial competition by manufacturers of liquid crystal displays (LCDs) to provide many techniques to improve performance of their liquid crystal displays (LCDs).

A liquid crystal display (LCD) generally includes two substrates and a liquid crystal layer disposed between the substrates. The liquid crystal layer is typically injected between the two substrates to position it between the two substrates when manufacturing the liquid crystal display (LCD).

The process of positioning the liquid crystal layer between the two substrates may be a factor in increasing the manufacturing time of the liquid crystal display (LCD).

The above information disclosed in this Background section is only for enhancement of understanding of the background of the described technology and therefore it may contain information that does not form the prior art that is already known in this country to a person of ordinary skill in the art.

SUMMARY OF CERTAIN INVENTIVE ASPECTS

An exemplary embodiment provides a liquid crystal display (LCD) and a manufacturing method thereof that may reduce manufacturing time of the liquid crystal display (LCD).

One embodiment provides a liquid crystal display (LCD) including: a first substrate; a second substrate facing the first substrate; an electrode portion formed on at least one of the first substrate and the second substrate, and forming an electric field between the first substrate and the second substrate; and a liquid crystal film positioned between the first substrate and the second substrate, wherein at least one liquid crystal space is positioned with a liquid crystal therein.

A plurality of liquid crystal spaces may be formed, and the liquid crystal film may further include a high molecular material positioned between the liquid crystal spaces to form the liquid crystal spaces.

The width of each liquid crystal space may be in the range of about 1 nm to about 380 nm.

The high molecular material may be a solid.

The electrode portion may include a first electrode positioned on the first substrate, and a second electrode positioned between the first electrode and the liquid crystal film.

The electrode portion may include a third electrode positioned on the first substrate, and a fourth electrode positioned neighboring the third electrode on the first substrate.

The electrode portion may include a fifth electrode positioned on the first substrate, and a sixth electrode positioned between the second substrate and the liquid crystal film.

The electrode portion may include a plurality of electrodes, and at least one of the plurality of electrodes may have a shape that is bent at least once.

The liquid crystal display (LCD) may further include a first polarizing plate attached to an outer surface of the first substrate and having a first optical axis, and a second polarizing plate attached to an outer surface of the second substrate and having a second optical axis crossing the first optical axis.

Another embodiment includes: providing a first substrate, a second substrate, and an electrode portion forming an electric field to at least one of the first substrate and the second substrate; forming a liquid crystal film including at least one liquid crystal space that a liquid crystal is positioned therein on the first substrate; and assembling the first substrate and the second substrate via the liquid crystal film disposed therebetween.

The forming of the liquid crystal film may be executed by printing the liquid crystal film on the first substrate.

The forming of the liquid crystal film may be executed by coating a high molecular material forming the liquid crystal space on the first substrate.

Another embodiment includes: transferring a first mother substrate in one direction; continuously forming a liquid crystal film including at least one liquid crystal space that a liquid crystal is positioned therein on the first mother substrate in the one direction; transferring the first mother substrate, the liquid crystal film, and the second mother substrate in the one direction by positioning a second mother substrate on the first mother substrate via the liquid crystal film; and cutting the first mother substrate, the liquid crystal film, and the second mother substrate with a predetermined width.

At least one of the transferring of the first mother substrate, the continuous forming of the liquid crystal film, and the transferring of the first mother substrate, the liquid crystal film, and the second mother substrate may be executed by using a roll.

The continuous forming of the liquid crystal film may be executed by coating a high molecular material forming the liquid crystal space on the first mother substrate.

The continuous forming of the liquid crystal film may be executed by printing the liquid crystal film on the first mother substrate.

At least one of the first mother substrate and the second mother substrate may be a flexible substrate.

In one embodiment, a liquid crystal display (LCD) includes: a first substrate; a second substrate facing the first substrate; an electrode portion formed on at least one of the first substrate and the second substrate, and configured to generate an electric field between the first substrate and the second substrate; and a liquid crystal film positioned between the first substrate and the second substrate, where at least one liquid crystal and an associated liquid crystal space is positioned in the liquid crystal film.

The liquid crystal film may further include a high molecular material positioned between the liquid crystal spaces.

The width of each liquid crystal space may be in the range of about 1 nm to about 380 nm.

The high molecular material may include a solid material.

The electrode portion may include: a first electrode positioned on the first substrate; and a second electrode positioned between the first electrode and the liquid crystal film.

The electrode portion may include: a first electrode and a second electrode positioned on the first substrate.

The electrode portion may include: a first electrode positioned on the first substrate; and a second electrode positioned between the second substrate and the liquid crystal film.

The electrode portion may include a plurality of electrodes, where at least one of the plurality of electrodes has a shape that is bent at least once.

The liquid crystal display may further include: a first polarizing plate attached to an outer surface of the first substrate and having a first optical axis; and a second polarizing plate attached to an outer surface of the second substrate and having a second optical axis crossing the first optical axis.

In another embodiment, a method for manufacturing a liquid crystal display (LCD), includes: providing a first substrate, a second substrate, and an electrode portion configured to generate an electric field; forming a liquid crystal film on the first substrate, the liquid crystal film including at least one liquid crystal and an associated liquid crystal space; and assembling the first substrate and the second substrate to each other with the liquid crystal film disposed therebetween.

The forming of the liquid crystal film may include printing the liquid crystal film on the first substrate.

The forming of the liquid crystal film on the first substrate may include coating a high molecular material on the first substrate.

In another embodiment, a method for manufacturing a liquid crystal display (LCD), includes: transferring a first mother substrate in a first direction; continuously forming a liquid crystal film on the first mother substrate in the first direction, the liquid crystal film including at least one liquid crystal with an associated liquid crystal space; positioning a second mother substrate on the first mother substrate via the liquid crystal film; transferring the second mother substrate in the first direction; and cutting the first mother substrate, the liquid crystal film, and the second mother substrate with a predetermined width.

At least one of the transferring of the first mother substrate, the continuous forming of the liquid crystal film, and the transferring of the first mother substrate, the liquid crystal film, and the second mother substrate may include using a roll.

The continuous forming of the liquid crystal film on the first mother substrate may include coating a high molecular material.

The continuous forming of the liquid crystal film on the first mother substrate may include printing the liquid crystal film.

At least one of the first mother substrate and the second mother substrate may include a flexible material.

BRIEF DESCRIPTION OF THE DRAWINGS

FIG. 11 shows a top plan view of an electrode portion of an embodiment of the liquid crystal display (LCD) shown in FIG. 10.

DETAILED DESCRIPTION OF CERTAIN INVENTIVE EMBODIMENTS

Figure 1:
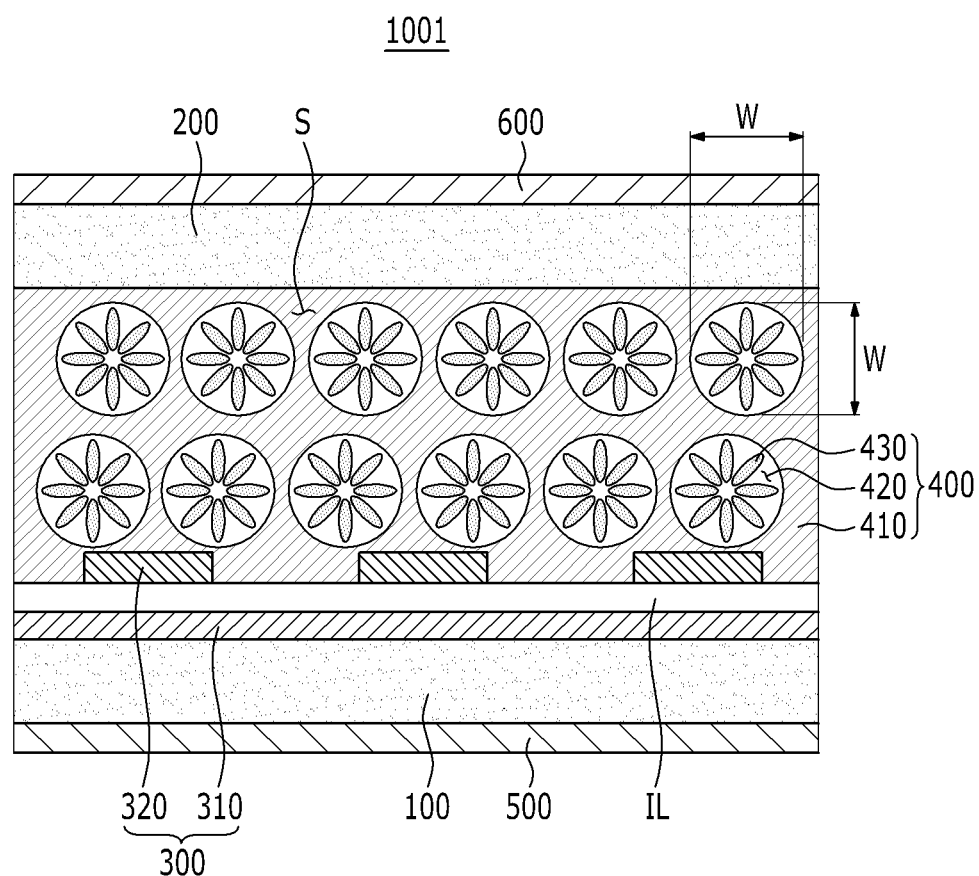
FIG. 1 shows a cross-sectional view of an embodiment of a liquid crystal display (LCD).

Hereinafter, several embodiments have been shown and described in detail to be easily performed by those skilled in the art with reference to the accompanying drawings. The embodiments may be modified in various ways.

In the disclosure, like elements or equivalents are generally referred to by the same reference numerals throughout the specification.

Since sizes and thicknesses of constituent members shown in the accompanying drawings are arbitrarily given for better understanding and ease of description, embodiments are not limited to the illustrated sizes and thicknesses.

In the drawings, the thicknesses of layers, films, panels, regions, etc., are exaggerated for clarity, better understanding, and convenience in description. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, throughout the disclosure, "on" implies being positioned above or below a target element and does not imply being necessarily positioned on the top on the basis of a gravity direction.

A liquid crystal display (LCD) according to a first exemplary embodiment will be described with reference to FIGS. 1 to 3.

FIG. 1 shows a cross-sectional view of an embodiment of a liquid crystal display (LCD).

As shown in FIG. 1, an embodiment of a liquid crystal display (LCD) 1001 includes a first substrate 100, a second substrate 200, an electrode portion 300, a liquid crystal film 400, a first polarizing plate 500, and a second polarizing plate 600.

The first substrate 100 may be a transparent substrate including at least one of transparent glass and a polymer, and a gate line, a data line, and a thin film transistor (TFT) may be formed on the transparent substrate (not shown).

The second substrate 200 faces the first substrate 100, and a space S is formed between the second substrate 200 and the first substrate 100. The second substrate 200 may be a transparent substrate including at least one of transparent glass and a polymer, and a black matrix (BM) (not shown) opposing the thin film transistor of the first substrate 100 and formed on the transparent substrate. The electrode portion 300 is positioned in the space S formed between the second substrate 200 and the first substrate 100.

The electrode portion 300 forms an electric field in the space S, and includes a first electrode 310 and a second electrode 320.

The first electrode 310 is positioned on the first substrate 100, and includes a transparent conducting material such as indium tin oxide (ITO) or indium zinc oxide (IZO). The first electrode 310 may be formed with a plate shape on the first substrate 100, and the plate shape may be partially patterned. The second electrode 320 is positioned on the first electrode 310 via an insulation layer IL.

The second electrode 320 is disposed between the first electrode 310 and the liquid crystal film 400, and may be patterned with a shape corresponding to each pixel, a minimum unit of the image displayed through the liquid crystal display (LCD) 1001. When a voltage is applied across the second electrode 320 and the first electrode 310, an electric field is formed in the space S. The second electrode 320 includes a transparent conducting material such as indium tin oxide or indium zinc oxide.

Figure 2:
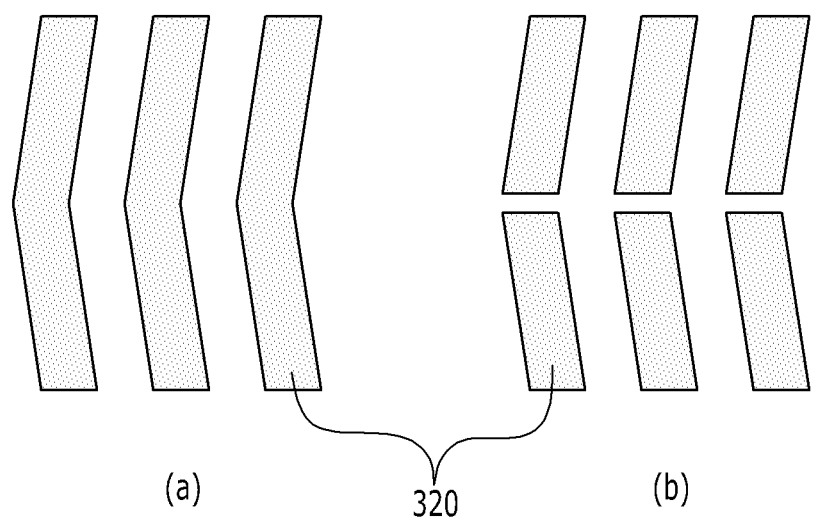
FIG. 2 shows a top plan view of an electrode portion of an embodiment of the liquid crystal display (LCD) shown in FIG. 1.

FIG. 2 shows a top plan view of an electrode portion 300 of an embodiment of a liquid crystal display (LCD) shown in FIG. 1.

As shown in FIG. 2, the second electrode 320 includes a plurality of electrodes facing each pixel and separated from each other, at least one electrode of the plurality of electrodes has a shape that is bent at least once. In detail, the plurality of electrodes corresponding to each pixel may be formed with the bent shape as shown in part (a) of FIG. 2, or may be formed such that the bent portions are separated from each other as shown in part (b) of FIG. 2.

When a voltage is applied across the first electrode 310 and the second electrode 320, an electric field according to the bent shape of the second electrode 320 is formed between the first electrode 310 and the second electrode 320, a liquid crystal inside the liquid crystal film 400 is shifted according to the electric field such that it has a multi-domain corresponding to each pixel. The liquid crystal display (LCD) 1001 thereby has optical isotropy at the side of the liquid crystal display (LCD) 1001 as well as at the front of the liquid crystal display (LCD) 1001. The bent shape of the plurality of electrodes included in the second electrode 320 help the liquid crystal display (LCD) 1001 have optical isotropy over a wide range, thereby improving the viewing angle of the liquid crystal display (LCD) 1001.

Referring again to FIG. 1, the liquid crystal film 400 is positioned on the electrode portion 300. The liquid crystal film 400 is positioned between the first substrate 100 and the second substrate 200, and includes a high molecular material 410, a liquid crystal space 420, and a liquid crystal 430.

The high molecular material 410 is a solid, and it fills the space S formed between the first substrate 100 and the second substrate 200. A plurality of liquid crystal spaces 420 are formed in the high molecular material 410, and the high molecular material 410 is disposed between neighboring liquid crystal spaces 420. The position of the liquid crystal space 420 is supported by the high molecular material 410 inside the space S.

In other embodiments, the high molecular material may be made of a fluid, and the liquid crystal space 420 may be arranged to allow the high molecular material 410 to flow.

The liquid crystal spaces 420 may be disorderly arranged or orderly arranged in the high molecular material 410, and the liquid crystal 430 is positioned therein. Without an electric field applied in the space S, the liquid crystal 430 positioned inside the liquid crystal space 420 may have various arrangement shapes such as radial, bipolar, toroidal, and axial. The shape of the liquid crystal 430 positioned in the liquid crystal space 420 is not limited in this state (in which the electric field is not applied).

The liquid crystal space 420 may be formed with a polygonal shape such as circular, triangular, or quadrangular, and the maximum width W thereof may be in a range of about 1 nm to about 380 nm. The liquid crystal space 420 may have various shapes by the pressure applied from the outside or by the pressure between the mutually neighboring liquid crystal spaces 420 in the high molecular material 410.

In conventional liquid crystal displays (LCD), the liquid crystal positioned between two substrates changes the optical axis of light passing through the liquid crystal display (LCD) from the backlight unit when an electric field is applied between two substrates. Without an electric field applied between the two substrates, the liquid crystal does not change the optical axis of the light passing through the liquid crystal display (LCD) and the arrangement state thereof is maintained by the alignment layer. In conventional liquid crystal displays (LCD), control of an initial arrangement state of the liquid crystal positioned between the two substrates may be necessary.

In some embodiments of the liquid crystal display (LCD) 1001, the liquid crystal space 420 of the liquid crystal film 400 has a width W that is less than about 380 nm such that when an electric field is not applied in the space S, the light passing through the liquid crystal display (LCD) 1001 is transmitted to the liquid crystal film 400 as it is. Rays of light with a wavelength of about 380 nm to about 770 nm are visible to humans, and since the liquid crystal space 420 has a width W of less than about 380 nm, the light of the visible rays transmitted through the liquid crystal display (LCD) 1001 transmits through the liquid crystal film 400 regardless of the arrangement of the liquid crystal 430 positioned in the liquid crystal space 420.

When the electric field is not applied in the space S where the liquid crystal film 400 is positioned, the light emitted from the backlight unit to the liquid crystal display (LCD) 1001 is transmitted through the liquid crystal film 400. However the light transmitting through the liquid crystal film 400 is not seen because of the first polarizing plate 500 attached on the outer surface of the first substrate 100 and the second polarizing plate 600 attached on the outer surface of the second substrate 200. The first polarizing plate 500 only transmits light having a first optical axis, the second polarizing plate 600 only transmits light having a second optical axis crossing the first optical axis such that the light passing through the first polarizing plate 500 and the liquid crystal film 400 is not transmitted through the second polarizing plate 600 when an electric field is not applied in the space S. A user observing the liquid crystal display (LCD) 1001 only sees a black image.

When no electric field is formed in the space S between the first substrate 100 and the second substrate 200, the liquid crystal film 400 transmits the light emitted to the liquid crystal film 400 as it is, regardless of the arrangement shape of the liquid crystal 430 positioned in the liquid crystal space 420.

Figure 3:
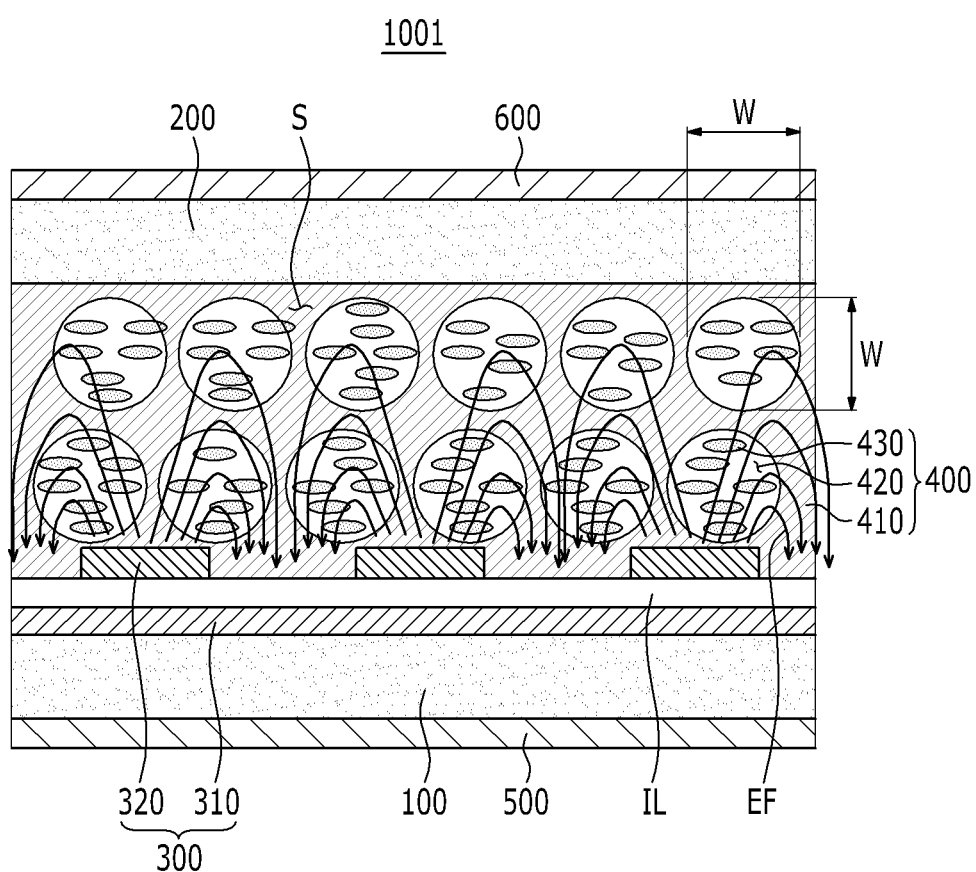
FIG. 3 illustrates operation of an embodiment of a liquid crystal display (LCD).

Referring to FIG. 3, details of operation will be described when an electric field is formed in the space S between the first substrate 100 and the second substrate 200.

FIG. 3 illustrates operation of an embodiment of a liquid crystal display (LCD).

As shown in FIG. 3, when an electric field EF is applied in the space S between the first substrate 100 and the second substrate 200, the liquid crystal 430 positioned in the liquid crystal space 420 is shifted according to the direction and the intensity of the electric field EF such that the liquid crystal 430 has a predetermined arrangement. The light emitted from the backlight unit to the liquid crystal film 400 and passing through the liquid crystal film 400 is polarized by the liquid crystal 430 having the predetermined arrangement. The light passing through the liquid crystal film 400 coming from the direction of the first polarizing plate 500 is transmitted to the second polarizing plate 600. Light coming from the direction of the second polarizing plate 600 is transmitted to the first polarizing plate 500. A user observing the liquid crystal display (LCD) 1001 recognizes a white image.

The white image may include a colored image except for black, and when a color converting means such as a color filter is positioned on the path of the light passing through the liquid crystal display (LCD) 1001, the user recognizes the image having a color corresponding to the color filter.

As described above, an embodiment of the liquid crystal display (LCD) 1001 includes the liquid crystal 430 that is positioned in the liquid crystal space 420 having the width W of about 1 nm to about 380 nm such that an alignment layer controlling the arrangement state of the liquid crystal 430 is not necessary. This reduces the manufacturing time and cost of the liquid crystal display (LCD) 1001.

In embodiments of the liquid crystal display (LCD) 1001, the liquid crystal space 420 is supported by the high molecular material 410 made of a solid such that floating of the liquid crystal 430 positioned in the liquid crystal space 420 is limited. Accordingly, floating of the liquid crystal 430 by external pressure may be minimized. Therefore, when pressure is applied to the liquid crystal display (LCD) 1001 by touch, the floating of the liquid crystal 430 by the pressure is minimized such that the deterioration of the display quality by the floating of the liquid crystal 430 may be minimized.

In embodiments of the liquid crystal display (LCD) 1001, the liquid crystal space 420 of the liquid crystal film 400 has a width of about 1 nm to about 380 nm, so when an electric field is not applied in the space S, the light passing through the liquid crystal display (LCD) 1001 is transmitted to the liquid crystal film 400 as it is. When viewing the liquid crystal display (LCD) 1001 from the front or from the side, the light is transmitted to the liquid crystal film 400 of the liquid crystal display (LCD) 1001 such that the liquid crystal display (LCD) 1001 has the isotropic characteristic for the black image, and this functions as a factor in improving the viewing angle. Therefore, in embodiments of the liquid crystal display (LCD) 1001, the viewing angle for the black image is improved such that the contrast ratio of the image displayed by the liquid crystal display (LCD) 1001 is improved.

An embodiment of a manufacturing method of an embodiment of a liquid crystal display (LCD) will be described with reference to FIGS. 4 to 6.

Figure 4:
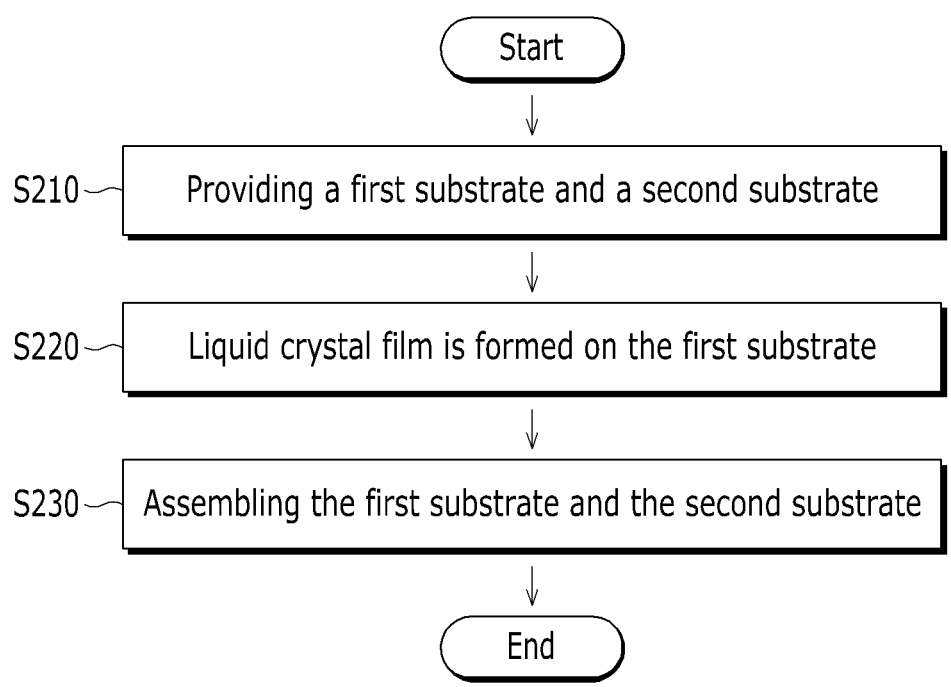
FIG. 4 shows a flowchart of an embodiment of a manufacturing method of an embodiment of a liquid crystal display (LCD).

FIG. 4 shows a flowchart of an embodiment of a manufacturing method of a liquid crystal display (LCD). FIGS. 5 and 6 illustrate an embodiment of a manufacturing method of an embodiment of liquid crystal display (LCD).

As shown in FIG. 4, the first substrate 100 and the second substrate 200 are provided (S210).

The first substrate 100 and the second substrate 200 are provided by using microelectromechanical systems (MEMS) such as a photolithography process. The electrode portion 300 including the first electrode 310 and the second electrode 320 is formed on the first substrate 100.

Figure 5:
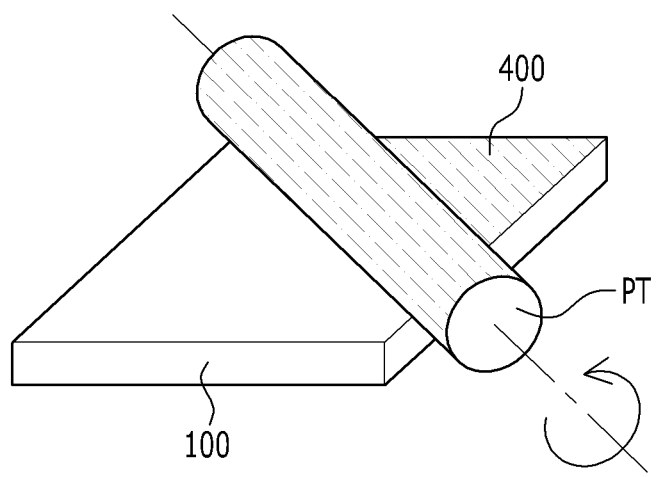
FIGS. 5 and 6 illustrate an embodiment of a manufacturing method of an embodiment of a liquid crystal display (LCD).
Figure 6:
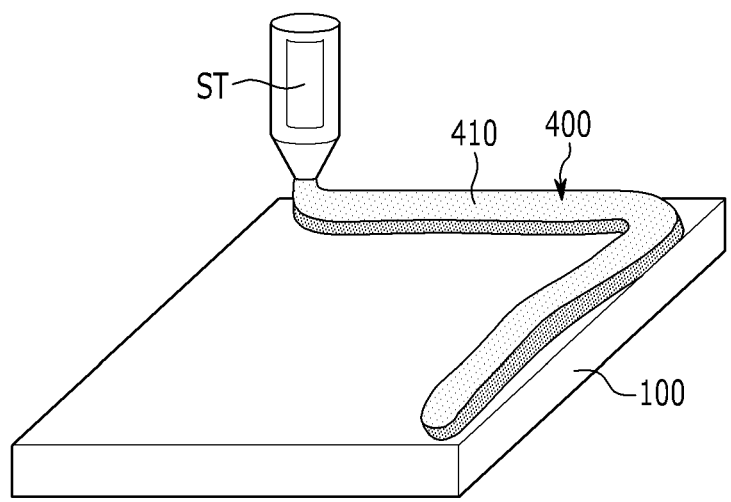

As shown in FIG. 5 and FIG. 6, the liquid crystal film 400 is formed on the first substrate 100 (S220 in FIG. 4).

As shown in FIG. 5, the liquid crystal film 400 is printed on the first substrate 100 by using a printing means PT to form the liquid crystal film 400 on the first substrate 100, or as shown in FIG. 6, the high molecular material 410 forming the liquid crystal space 420 positioned with the liquid crystal 430 is coated on the first substrate 100 by using a coating means ST to form the liquid crystal film 400 on the first substrate 100.

Next, the first substrate 100 and the second substrate 200 are assembled and combined (S230 in FIG. 4).

A sealant is coated on the edge of at least one of the substrates, and the first substrate 100 and the second substrate 200 are combined by using the sealant, interposing the liquid crystal film 400 therebetween.

The first polarizing plate 500 and the second polarizing plate 600 are respectively attached to the outer surfaces of the first substrate 100 and the second substrate 200 to manufacture the liquid crystal display (LCD) 1001.

In an embodiment of the manufacturing method of the liquid crystal display (LCD), the liquid crystal display (LCD) 1001 is manufactured by using the liquid crystal film 400 such that it is not necessary to form an alignment layer for controlling the arrangement state of the liquid crystal 430. Since an alignment layer is not formed, a rubbing process is not necessary. This may minimize the manufacturing time and cost of the liquid crystal display (LCD) 1001.

Another embodiment of a manufacturing method of the liquid crystal display (LCD) will be described with reference to FIGS. 7 to 9.

Figure 7:
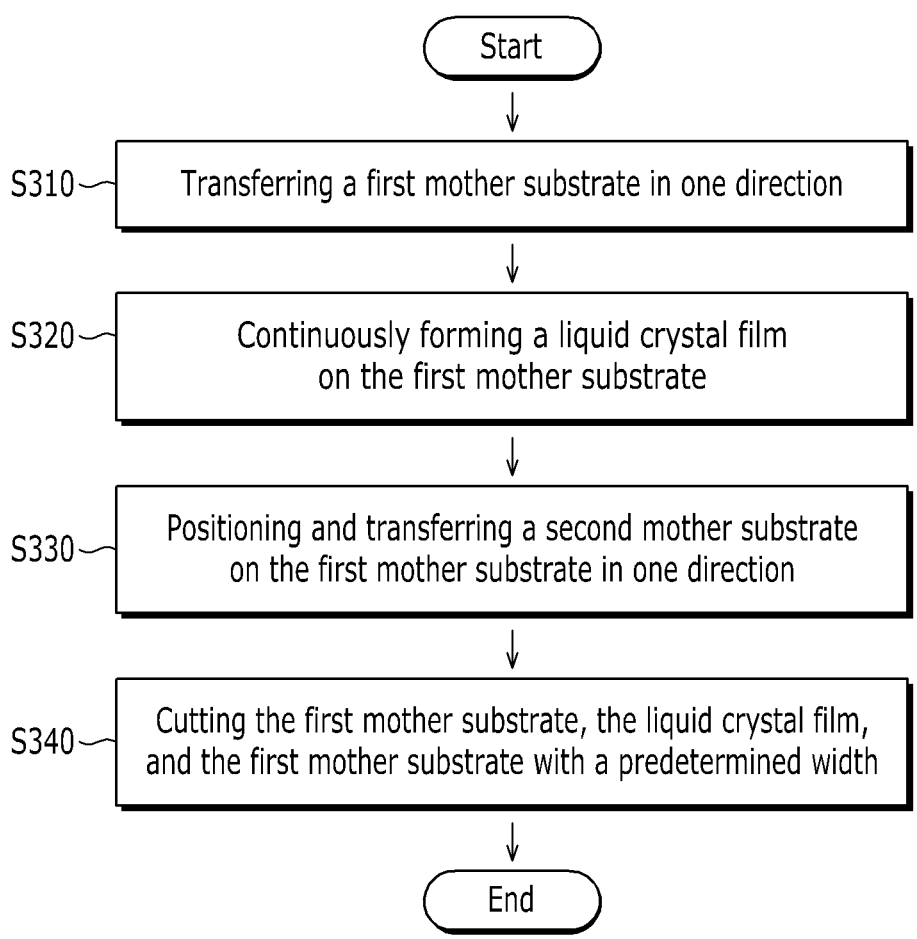
FIG. 7 shows a flowchart of an embodiment of a manufacturing method of an embodiment of a liquid crystal display (LCD).

FIG. 7 shows a flowchart of an embodiment of a manufacturing method of an embodiment of a liquid crystal display (LCD). FIGS. 8 and 9 illustrate an embodiment of a manufacturing method of a liquid crystal display (LCD).

Figure 8:
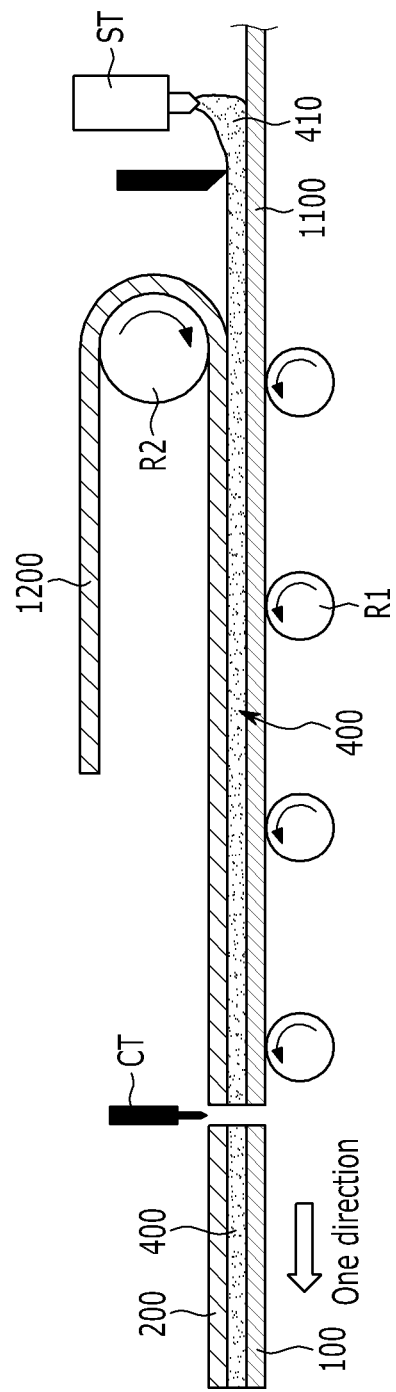
FIGS. 8 and 9 illustrate an embodiment of a manufacturing method of an embodiment of a liquid crystal display (LCD).

As shown in FIGS. 7 and 8, a first mother substrate 1100 is transferred in one direction (S310).

The first mother substrate 1100 including first substrates 100 that are continuously arranged is provided by using the MEMS such as the photolithography process, and the first mother substrate 1100 is transferred in the one direction by using a first roll R1. The electrode portion 300 including the first electrode 310 and the second electrode 320 is formed on the first mother substrate 1100. The first mother substrate 1100 may be a flexible substrate.

Figure 9:
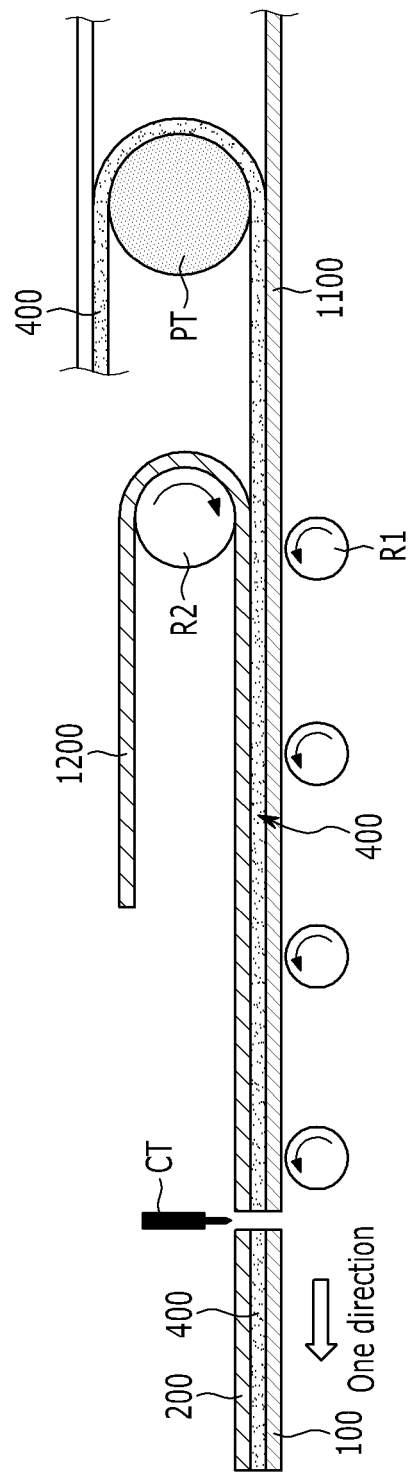

As shown in FIGS. 8 and 9, the liquid crystal film 400 is continuously formed on the first mother substrate 1100 (S320 in FIG. 7).

As shown in FIG. 8, the high molecular material 410 forming the liquid crystal space 420 in which the liquid crystal 430 is positioned is formed on the first mother substrate 1100 by using a coating means ST to continuously form the liquid crystal film 400 on the first mother substrate 1100. In other embodiments, as shown in FIG. 9, the previously provided liquid crystal film 400 is printed on the first mother substrate 1100 by using a printing means PT to continuously form the liquid crystal film 400 on the first mother substrate 1100.

A second mother substrate 1200 is positioned on the first mother substrate 1100 and transferred in the one direction (S330 in FIG. 7).

The second mother substrate 1200 in which second substrates 200 are continuously connected is provided. The second mother substrate 1200 is positioned on the first mother substrate 1100 by using the second roll R2 corresponding to the first roll R1 via the liquid crystal film 400 disposed therebetween, and then the first mother substrate 1100, the liquid crystal film 400, and the second mother substrate 1200 are transferred in the one direction by using the rotation motion of the first roll R1 and the second roll R2. The second mother substrate 1200 may be a flexible substrate.

The first mother substrate 1100, the liquid crystal film 400, and the second mother substrate 1200 are cut with a predetermined width (S340 in FIG. 7).

The first mother substrate 1100, the liquid crystal film 400, and the second mother substrate 1200 are cut with a predetermined width by using a cutting means CT. The first polarizing plate 500 and the second polarizing plate 600 may be respectively attached to the first mother substrate 1100 and the second mother substrate 1200, or may be respectively attached to the first substrate 100 and the second substrate 200 that are cut from the first mother substrate 1100 and the second mother substrate 1200.

The above-described processes may be continuously executed, and liquid crystal displays (LCDs) 1001 may be continuously manufactured.

As described above, in some embodiments of the manufacturing method of the liquid crystal display (LCD), the liquid crystal display (LCD) 1001 is manufactured by using a liquid crystal film 400 such that it is not necessary to form an alignment layer controlling the arrangement state of the liquid crystal 430. By not forming an alignment layer, a rubbing process is not necessary. This may minimize the manufacturing time and cost of the liquid crystal display (LCD) 1001.

Also, in some embodiments, the liquid crystal display (LCD) may be continuously manufactured such that the manufacturing time and cost of the liquid crystal display (LCD) 1001 may be minimized.

Another embodiment of a liquid crystal display (LCD) 1004 will be described with reference to FIGS. 10 and 11.

Only portions different from the above described embodiments are described.

Figure 10:
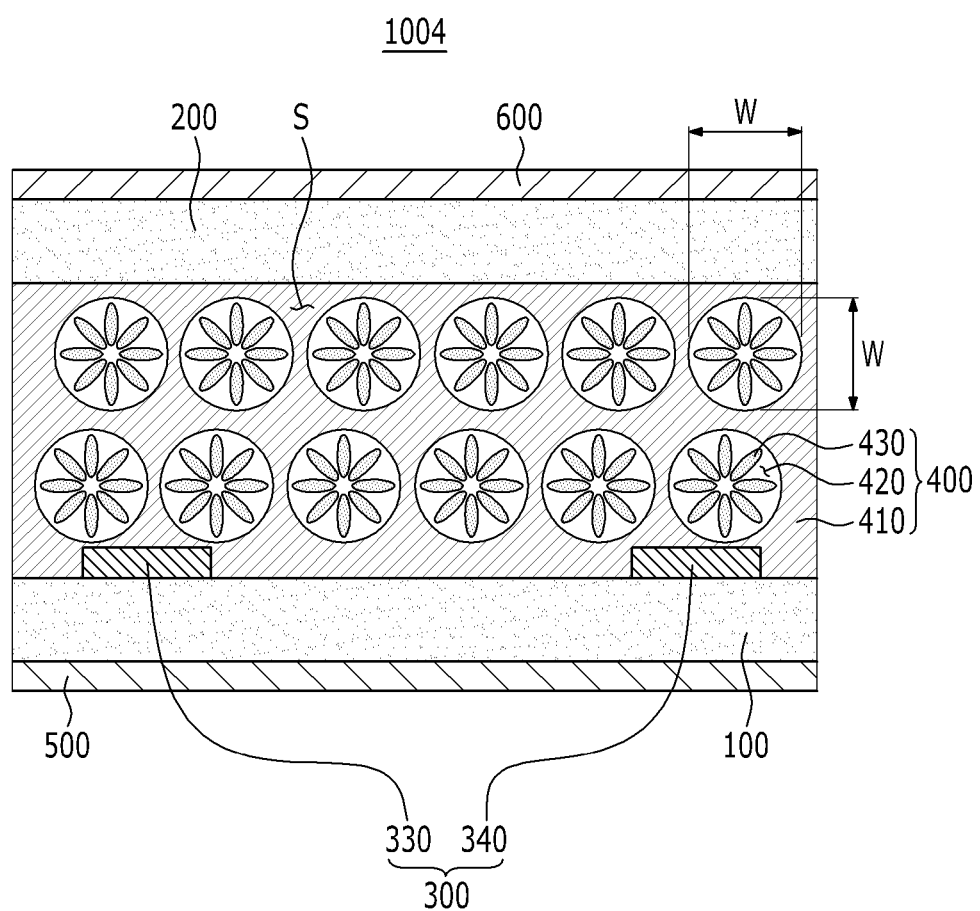
FIG. 10 shows a cross-sectional view of an embodiment of a liquid crystal display (LCD).

FIG. 10 shows a cross-sectional view of another embodiment of a liquid crystal display (LCD). FIG. 11 shows a top plan view of an electrode portion of an embodiment of the liquid crystal display (LCD) 1004 shown in FIG. 10.

As shown in FIGS. 10 and 11, the electrode portion 300 forms the electric field in the space S, and includes a third electrode 330 and a fourth electrode 340.

The third electrode 330 and the fourth electrode 340 are formed on the first substrate 100, and may include a transparent conducting material such as indium tin oxide or indium zinc oxide. The third electrode 330 and the fourth electrode 340 may be patterned with a shape corresponding to each pixel. When a voltage is applied across the third electrode 330 and the fourth electrode 340, an electric field is applied to the space S.

The third electrode 330 and the fourth electrode 340 may include a plurality of electrodes corresponding to each pixel and may be separated from each other, and at least one of the plurality of electrodes may have a shape that is bent at least once. The plurality of electrodes corresponding to each pixel may be positioned with the bent shape as shown in part (a) of FIG. 11, or may be positioned with the shape in which the bent portions are separated from each other as shown in part (b) of FIG. 11.

When a voltage is applied across the third electrode 330 and the fourth electrode 340, an electric field according to the bent shape of the third electrode 330 and the fourth electrode 340 is formed between the third electrode 330 and the fourth electrode 340. The liquid crystal inside a liquid crystal film 400 is shifted corresponding to the electric field that has the multi-domain corresponding to each pixel, and thereby the liquid crystal display (LCD) 1004 has optical isotropy in the side of the liquid crystal display (LCD) 1004 as well as the front of the liquid crystal display (LCD) 1004. The plurality of electrodes included in the third electrode 330 and the fourth electrode 340 have the shape that is bent at least once such that the liquid crystal display (LCD) 1004 has optical isotropy of a wide range, thereby improving the viewing angle of the liquid crystal display (LCD) 1004.

In some embodiments, the liquid crystal display (LCD) 1004 includes the liquid crystal 430 that is positioned in the liquid crystal space 420 having the width W of about 1 nm to about 380 nm such that the manufacturing time and cost of the liquid crystal display (LCD) 1004 may be minimized.

In some embodiments, the liquid crystal display (LCD) 1004, the position of the liquid crystal space 420 is supported by the high molecular material 410 such that the floating of the liquid crystal 430 positioned in the liquid crystal space 420 is limited, and thereby the floating of the liquid crystal 430 by external pressure may be minimized, and therefore the deterioration of the display quality by the floating of the liquid crystal 430 may be minimized.

In some embodiments, the liquid crystal space 420 of the liquid crystal film 400 has a width of about 1 nm to about 380 nm such that the liquid crystal display (LCD) 1004 has the optical isotropic characteristic for the black image, and thereby the viewing angle of the liquid crystal display (LCD) 1004 for the black image is improved and the contrast ratio of the image displayed by the liquid crystal display (LCD) 1004 is improved.

Another embodiment of a liquid crystal display (LCD) 1005 will be described with reference to FIG. 12.

Figure 12:
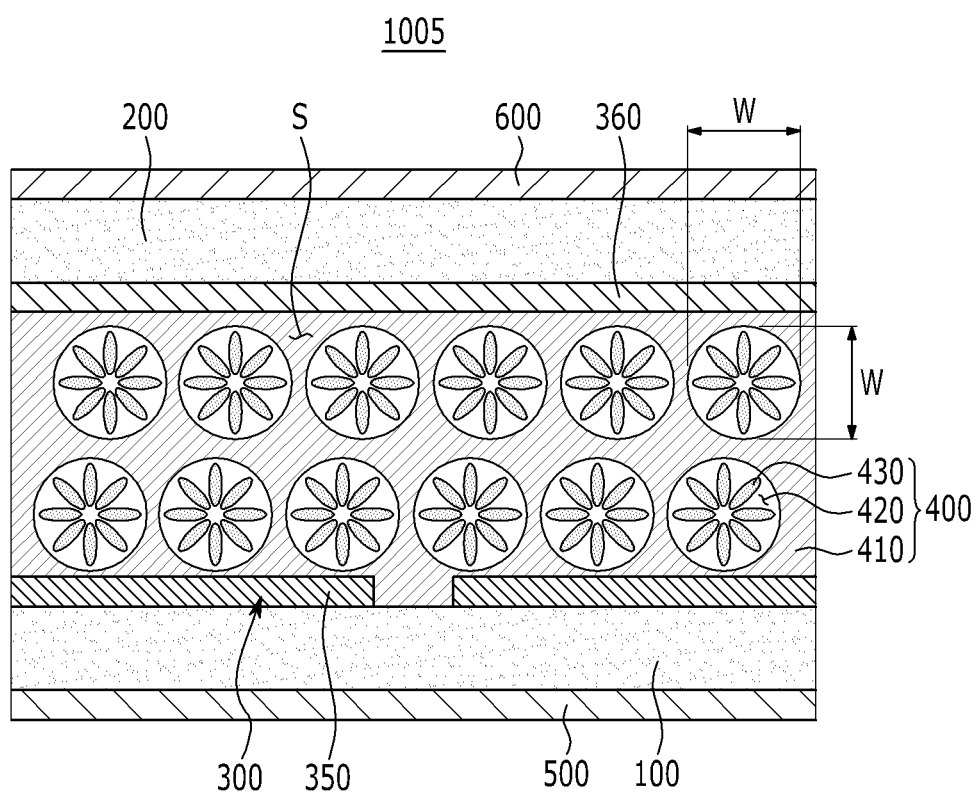
FIG. 12 shows a cross-sectional view of an embodiment of a liquid crystal display (LCD).

FIG. 12 shows a cross-sectional view of an embodiment of a liquid crystal display (LCD).

As shown in FIG. 12, the electrode portion 300 includes a fifth electrode 350 positioned on the first substrate 100 and a sixth electrode 360 positioned between the second substrate 200 and the liquid crystal film 400.

The fifth electrode 350 and the sixth electrode 360 are opposite to each other via the liquid crystal film 400, and may include a transparent conducting material such as indium tin oxide or indium zinc oxide. The fifth electrode 350 and the sixth electrode 360 may be patterned with the shape corresponding to each pixel. When a voltage is applied across the fifth electrode 350 and the sixth electrode 360, an electric field is generated in the space S.

In some embodiments, the liquid crystal 430 is positioned in the liquid crystal space 420 having a width W of about 1 nm to about 380 nm such that the manufacturing time and cost of the liquid crystal display (LCD) 1005 may be minimized.

In some embodiments, the position of the liquid crystal space 420 is supported by the high molecular material 410 such that the floating of the liquid crystal 430 positioned in the liquid crystal space 420 is limited. Accordingly, the floating of the liquid crystal 430 by the external pressure may be minimized such that the deterioration of the display quality by the floating of the liquid crystal 430 may be minimized.

In some embodiments, the liquid crystal space 420 of the liquid crystal film 400 has a width of about 1 nm to about 380 nm such that the liquid crystal display (LCD) 1005 has the optical isotropic characteristic for the black image, and thereby the viewing angle of the liquid crystal display (LCD) 1005 for the black image is improved and the contrast ratio of the image displayed by the liquid crystal display (LCD) 1005 is improved.

While this disclosure has been described in connection with certain exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD) comprising:
a first substrate;
a second substrate facing the first substrate;

an electrode portion formed on at least one of the first substrate and the second substrate, and configured to generate an electric field between the first substrate and the second substrate; and a liquid crystal film positioned between the first substrate and the second substrate, wherein at least one liquid crystal and an associated liquid crystal space is positioned in the liquid crystal film.

2. The liquid crystal display (LCD) of claim 1, wherein the liquid crystal film further comprises a high molecular material positioned between the liquid crystal spaces.

3. The liquid crystal display (LCD) of claim 2, wherein the width of each liquid crystal space is in the range of about 1 nm to about 380 nm.

4. The liquid crystal display (LCD) of claim 2, wherein the high molecular material comprises a solid material.

5. The liquid crystal display (LCD) of claim 1, wherein the electrode portion comprises:
   a first electrode positioned on the first substrate; and
   a second electrode positioned between the first electrode and the liquid crystal film.

6. The liquid crystal display (LCD) of claim 1, wherein the electrode portion comprises:
   a first electrode and a second electrode positioned on the first substrate.

7. The liquid crystal display (LCD) of claim 1, wherein the electrode portion comprises:
   a first electrode positioned on the first substrate; and
   a second electrode positioned between the second substrate and the liquid crystal film.

8. The liquid crystal display (LCD) of claim 1, wherein the electrode portion comprises a plurality of electrodes, and
wherein at least one of the plurality of electrodes has a shape that is bent at least once.

9. The liquid crystal display (LCD) of claim 1, further comprising:
   a first polarizing plate attached to an outer surface of the first substrate and having a first optical axis; and
   a second polarizing plate attached to an outer surface of the second substrate and having a second optical axis crossing the first optical axis.

10. A method for manufacturing a liquid crystal display (LCD), comprising:
    providing a first substrate, a second substrate, and an electrode portion configured to generate an electric field;
    forming a liquid crystal film on the first substrate, the liquid crystal film comprising at least one liquid crystal and an associated liquid crystal space; and
    assembling the first substrate and the second substrate to each other with the liquid crystal film disposed therebetween.

11. The method of claim 10, wherein
the forming of the liquid crystal film comprises printing the liquid crystal film on the first substrate.

12. The method of claim 10, wherein
the forming of the liquid crystal film on the first substrate comprises coating a high molecular material on the first substrate.

13. A method for manufacturing a liquid crystal display (LCD), comprising:
    transferring a first mother substrate in a first direction;
    continuously forming a liquid crystal film on the first mother substrate in the first direction, the liquid crystal film comprising at least one liquid crystal with an associated liquid crystal space;
    positioning a second mother substrate on the first mother substrate via the liquid crystal film;
    transferring the second mother substrate in the first direction; and
    cutting the first mother substrate, the liquid crystal film, and the second mother substrate with a predetermined width.

14. The method of claim 13, wherein
at least one of the transferring of the first mother substrate, the continuous forming of the liquid crystal film, and the transferring of the first mother substrate, the liquid crystal film, and the second mother substrate comprises using a roll.

15. The method of claim 13, wherein
the continuous forming of the liquid crystal film on the first mother substrate comprises coating a high molecular material.

16. The method of claim 13, wherein
the continuous forming of the liquid crystal film on the first mother substrate comprises printing the liquid crystal film.

17. The method of claim 13, wherein
at least one of the first mother substrate and the second mother substrate comprises a flexible material.

* * * * *